(12) United States Patent
Doyen et al.

(10) Patent No.: US 11,995,855 B2
(45) Date of Patent: May 28, 2024

(54) METHOD FOR DETECTING OCCLUSIONS IN AN IMAGE, CORRESPONDING DEVICE AND COMPUTER PROGRAM PRODUCT

(71) Applicant: InterDigital CE Patent Holdings, SAS, Paris (FR)

(72) Inventors: Didier Doyen, Cesson-Sevigne (FR); Valerie Allie, Cesson-Sevigne (FR); Tristan Langlois, Cesson-Sevigne (FR)

(73) Assignee: InterDigital CE Patent Holdings, SAS, Paris (FR)

( * ) Notice: Subject to any disclaimer, the term of this patent is extended or adjusted under 35 U.S.C. 154(b) by 602 days.

(21) Appl. No.: 17/258,373

(22) PCT Filed: Jul. 18, 2019

(86) PCT No.: PCT/EP2019/069372
§ 371 (c)(1),
(2) Date: Jan. 6, 2021

(87) PCT Pub. No.: WO2020/016357
PCT Pub. Date: Jan. 23, 2020

(65) Prior Publication Data
US 2021/0233266 A1    Jul. 29, 2021

(30) Foreign Application Priority Data

Jul. 19, 2018  (EP) ..................................... 18305986

(51) Int. Cl.
*G06T 7/11*  (2017.01)
*G06T 7/557* (2017.01)

(52) U.S. Cl.
CPC ............... *G06T 7/557* (2017.01); *G06T 7/11* (2017.01); *G06T 2207/10052* (2013.01)

(58) Field of Classification Search
CPC .. G06T 7/11; G06T 7/557; G06T 2207/10052
See application file for complete search history.

(56) References Cited

U.S. PATENT DOCUMENTS 8,619,082 B1  12/2013  Ciurea et al.
9,154,697 B2  10/2015  Geiss et al.
(Continued)

FOREIGN PATENT DOCUMENTS

CN      101312540 A     11/2008
CN      101720480 A      6/2010
(Continued)

OTHER PUBLICATIONS

Merrell et al. ("Real-Time Visibility-Based Fusion of Depth Maps," IEEE 11th International Conference on Computer Vision; Date of Conference: Oct. 14-21, 2007 ) (Year: 2007).*
(Continued)

*Primary Examiner* — Yubin Hung
(74) *Attorney, Agent, or Firm* — CONDO ROCCIA KOPTIW LLP

(57) ABSTRACT

A method is proposed for detecting occlusions in an image captured by a light field capturing system, comprising, for at least one reference image belonging to a matrix of images captured by the light field capturing system: —calculating a depth map and a visibility map for pixels in the reference image; —determining at least one candidate area in the reference image in which the potential occlusion may occur based at least on a segmentation of the depth map; —determining an information representative of an occlusion state in the at least one candidate area based at least on visibility values of the visibility map associated with at least two neighborhoods of the at least one candidate area.

23 Claims, 7 Drawing Sheets

(56) References Cited

U.S. PATENT DOCUMENTS

| | | | |
|---|---|---|---|
| 9,269,142 | B2 | 2/2016 | Bajard et al. |
| 9,813,607 | B2 | 11/2017 | Kalevo et al. |
| 2006/0204040 | A1 | 9/2006 | Freeman et al. |
| 2013/0077882 | A1* | 3/2013 | Venkataraman .......... G06T 9/20 382/233 |
| 2014/0079336 | A1* | 3/2014 | Venkataraman ........ G06T 5/002 382/275 |
| 2014/0321712 | A1* | 10/2014 | Ciurea ............... G02B 27/0075 382/106 |
| 2015/0254868 | A1 | 9/2015 | Srikanth et al. |
| 2016/0063715 | A1 | 3/2016 | Wan |
| 2017/0330376 | A1 | 11/2017 | Haseltine et al. |
| 2019/0057513 | A1* | 2/2019 | Jain ........................... G06T 7/13 |

FOREIGN PATENT DOCUMENTS

| | | |  | |
|---|---|---|---|---|
| CN | 101822068 | A | | 9/2010 |
| CN | 104662589 | A | | 5/2015 |
| CN | 107347151 | A | | 11/2017 |
| CN | 107376349 | A | | 11/2017 |
| CN | 107924572 | A | | 4/2018 |
| EP | 3273686 | A1 | * 1/2018 | ............. G06T 7/557 |
| WO | 2009004527 | A2 | | 1/2009 |
| WO | 2009047681 | A1 | | 4/2009 |
| WO | 2016167814 | A1 | | 10/2016 |

OTHER PUBLICATIONS

Li et al. ("Continuous depth map reconstruction from light fields," IEEE Transactions on Image Processing, vol. 24, Issue: 11, Nov. 2015) (Year: 2015).*

Wanner et al. ("Globally consistent depth labeling of 4D light fields," IEEE Conference on Computer Vision and Pattern Recognition; Date of Conference: Jun. 16-21, 2012) (Year: 2012).*

Xu et al. ("Least Commitment, Viewpoint-Based, Multi-view Stereo," Second International Conference on 3D Imaging, Modeling, Processing, Visualization & Transmission; Date of Conference: Oct. 13-15, 2012) (Year: 2012).*

Yang et al. ("All-in-focus synthetic aperture imaging," IEEE Transactions on Circuits and Systems for Video Technology, vol. 28, Iss. 2, Feb. 2018)) (Year: 2018).*

Wang et al. ("Occlusion-aware Depth Estimation Using Light-field Cameras," Proceedings of the IEEE International Conference on Computer Vision, 2015 (Year: 2015).*

CN107347151A TR EN machine translation full Mar. 20, 2020.

Wolff, Katja et al., "Point Cloud Noise and Outlier Removal for Image-Based 3D Reconstruction," 2016 Conference on 3D IEEE.

Tao Yang et al. "All-in-focus synthetic aperture imaging," International Conference on Simulation, Modeling, and Programming for Autonomous Robots, SIMPAR 2010, Jan. 1, 2014.

Sabater, N. et al., "Dataset and Pipeline for Multi-view Light-Field Video," 2017 IEEE Conference on Computer Vision and Pattern Recognition Workshops, Jul. 21, 2017.

Chia-Kai Liang et al, "Programmable aperture photography: Multiplexed Light Field Acquisition," ACM Transactions on Graphics vol. 27 No. 3, Aug. 1, 2008, pp. 55:1-55:10.

* cited by examiner

METHOD FOR DETECTING OCCLUSIONS IN AN IMAGE, CORRESPONDING DEVICE AND COMPUTER PROGRAM PRODUCT

CROSS REFERENCE TO RELATED APPLICATIONS

This application is the national stage entry under 35 U.S.C. § 371 of International Application PCT/EP2019/069372, filed Jul. 18, 2019, which was published in accordance with PCT Article 21(2) on Jan. 23, 2020 in English and which claims the benefit of European patent application 18305986.4 filed Jul. 19, 2018.

1. FIELD OF THE DISCLOSURE

The present disclosure relates generally to the field of capture of Light Field (LF) image or video.

More specifically, the disclosure relates to the detection of occlusions in an image captured by a light field capturing system (e.g. a camera rig or array, a plenoptic camera, etc.).

The disclosure can be of interest in any field where LF data processing and/or LF capture is of interest, both for professional and consumers.

2. TECHNOLOGICAL BACKGROUND

LF data consist either in:
multi-view video, i.e. in a video in which the images belonging to a matrix of images have been captured simultaneously from multiple camera angles, typically using a camera rig (also known as camera array); or
plenoptic video, also known as lenslet based video, i.e. in a video in which the images belonging to a matrix of images are sub-aperture images that have been captured simultaneously from a single camera using a micro-lens array in addition to the main lenses system, as for instance a plenoptic camera.

Such LF capturing system is able to capture the same scene from different viewpoints, thus delivering a matrix of images that have been captured simultaneously and that represent each one a different viewpoint. One interesting way to exploit these viewpoints is to display the corresponding images with the ability to get the "parallax". For instance, thanks to navigation means inside the content, the observer may indeed see a foreground object but he may also see a part of the background when he selects a different viewpoint based on a different image of the matrix of images captured by the LF capturing system.

The availability of the different viewpoints in a LF data leads to an enhanced amount of data available for detecting occlusions compared to traditional captures simply based on two views. In that perspective, one can expect that occlusions may be better detected when processing LF data than when using known technics.

There is thus a need for a method for detecting occlusions in an image captured by a LF capturing system that takes advantage of the different viewpoints in the images of the matrix of images captured by the LF capturing system.

However, the ability to see, during the rendering of the LF data, one object that is located in the background of the scene and behind other objects located in the foreground remains driven by the content of the LF data that have been captured. More particularly, if the considered object located in the background has been in the field of view of at least one of the capturing means of the LF capturing system during the capture, its rendering remains possible. Otherwise, it is not possible for the user to see the considered object during the rendering, whatever the selected viewpoint, and it is said that an occlusion occurred for that considered object.

Such occlusion depends on the positioning of the LF capturing system relative to the scene during the capture. More particularly, if the considered object cannot be captured by any of the capturing means of the LF capturing system when the LF capturing system is in a given position relative to the scene, it still may be captured when the LF capturing system is in another position relative to the scene.

Consequently, there is a need for a method for detecting occlusions in an image captured by a LF capturing system that remains light in term of computational load so as to be able to be enforced in real time (for instance to inform the user of the LF capturing system during the capture of a scene).

3. SUMMARY

The present disclosure relates to a method for detecting occlusions in an image captured by a light field capturing system, comprising, for at least one reference image belonging to a matrix of images captured by the light field capturing system:
calculating a depth map and a visibility map for pixels in the reference image;
determining at least one candidate area in the reference image in which the potential occlusion may occur based at least on a segmentation of the depth map;
determining an information representative of an occlusion state in the at least one candidate area based at least on visibility values of the visibility map associated with at least two neighborhoods of the at least one candidate area.

Another aspect of the disclosure pertains to a device for detecting occlusions in an image captured by a light field capturing system, comprising a processor or a dedicated machine configured for, for at least one reference image belonging to a matrix of images captured by the light field capturing system:
calculating a depth map and a visibility map for pixels in the reference image;
determining at least one candidate area in the reference image in which the potential occlusion may occur based at least on a segmentation of the depth map;
determining an information representative of an occlusion state in the at least one candidate area based at least on visibility values of the visibility map associated with at least two neighborhoods of the at least one candidate area.

In addition, the present disclosure concerns a non-transitory computer readable medium comprising a computer program product recorded thereon and capable of being run by a processor, including program code instructions comprising program code instructions for implementing a method for detecting occlusions in an image captured by a light field capturing system previously described.

4. LIST OF FIGURES

Other features and advantages of embodiments shall appear from the following description, given by way of indicative and non-exhaustive examples and from the appended drawings, of which:

FIGS. 2d to 2g illustrate some processing involved in the method of FIG. 4 when enforced by the LF capturing system of FIG. 1 with the configuration of the scene of FIG. 2a;

FIGS. 3c and 3d illustrate some processing involved in the method of FIG. 4 when enforced by the LF capturing system of FIG. 1 with the configuration of the scene of FIG. 3a;

5. DETAILED DESCRIPTION

In all of the figures of the present document, the same numerical reference signs designate similar elements and steps.

The disclosed technique relates to a method for detecting occlusions in an image captured by a LF capturing system.

More particularly, such method comprises a determining of a candidate area in a reference image (belonging to a matrix of images captured by the LF capturing system) in which a potential occlusion may occur based at least on a segmentation of a depth map associated to the reference image. An information representative of an occlusion state in the candidate area is determined based at least on visibility values associated with at least two neighborhoods of the candidate area in the reference image.

Thus, the determination of the information representative of the occlusion state takes advantage of the information available in the different views of the LF data, thus leading to improved results compared to known technics. Furthermore, the determination of the information representative of the occlusion state relies only on parameters easily derivable (e.g. depth and visibility) with few additional derivations so that the method can easily be enforced. For instance, the method can be used in a real time environment so as to inform the user of the LF capturing system during a capture of the image in question. In that particular case, the user is thus able to change the position and/or orientation of the LF capturing system so as to avoid the presence of the occlusion if any.

Figure 1:
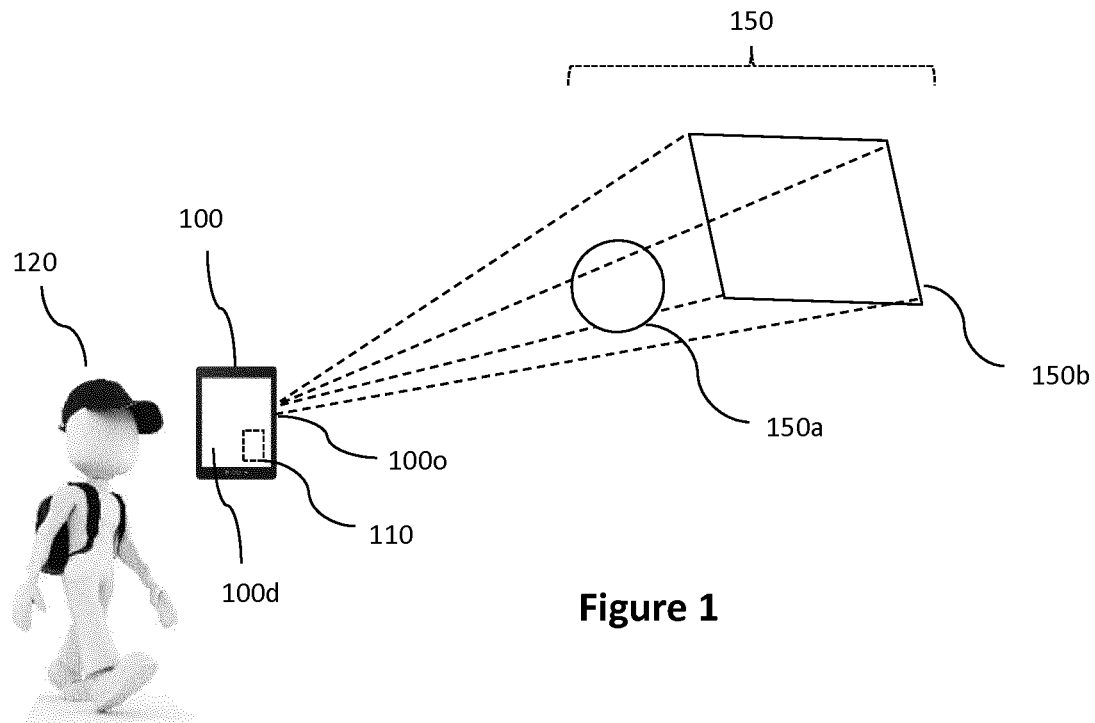
FIG. 1 illustrates a user of a LF capturing system capturing a scene comprising a foreground object and a background object.

We now describe in relationship with FIG. 1 a user of a LF capturing system 100 during a capture of a scene 150 comprising a foreground object 150a and a background object 150b. Two configurations of the scene 150 in which an occlusion occurs or not depending on the distance of the foreground object 150a relative to the LF capturing system 100 and to the background object 150b are further discussed in relationship with FIGS. 2a and 3a.

When capturing the scene 150 at a given instant, the LF capturing system 100 delivers a matrix of images belonging to a LF data, each image in the matrix capturing the scene 150 with a different viewpoint. For that, the LF capturing system 100 comprises an optical system 100o which is more particularly dedicated to the simultaneous capture of the images in the matrix.

Figure 2A:
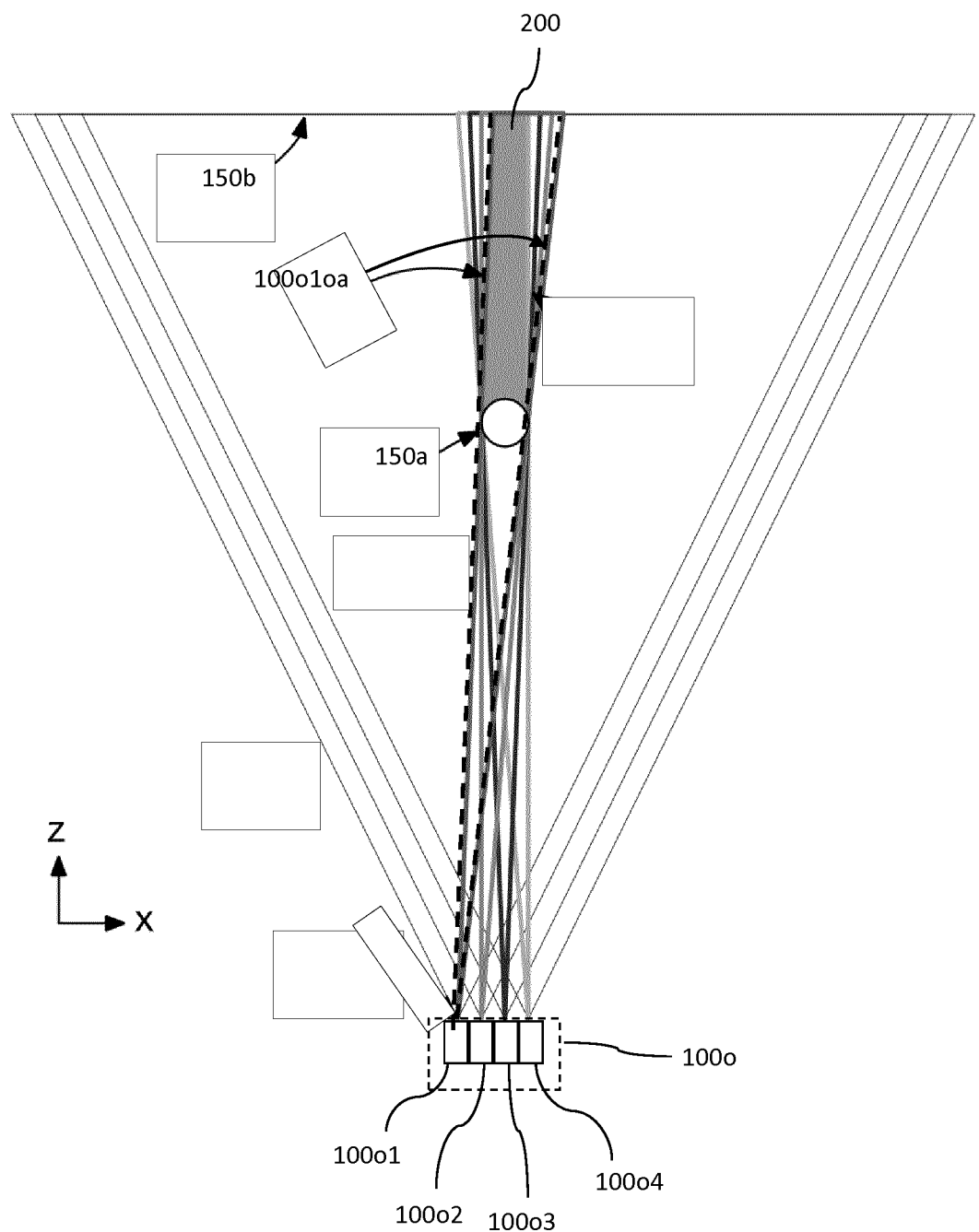
FIGS. 2a and 3a illustrate two configurations of the scene of FIG. 1 in which an occlusion occurs or not depending on the distance of the foreground object relative to the LF capturing system and to the background object.
Figure 3A:
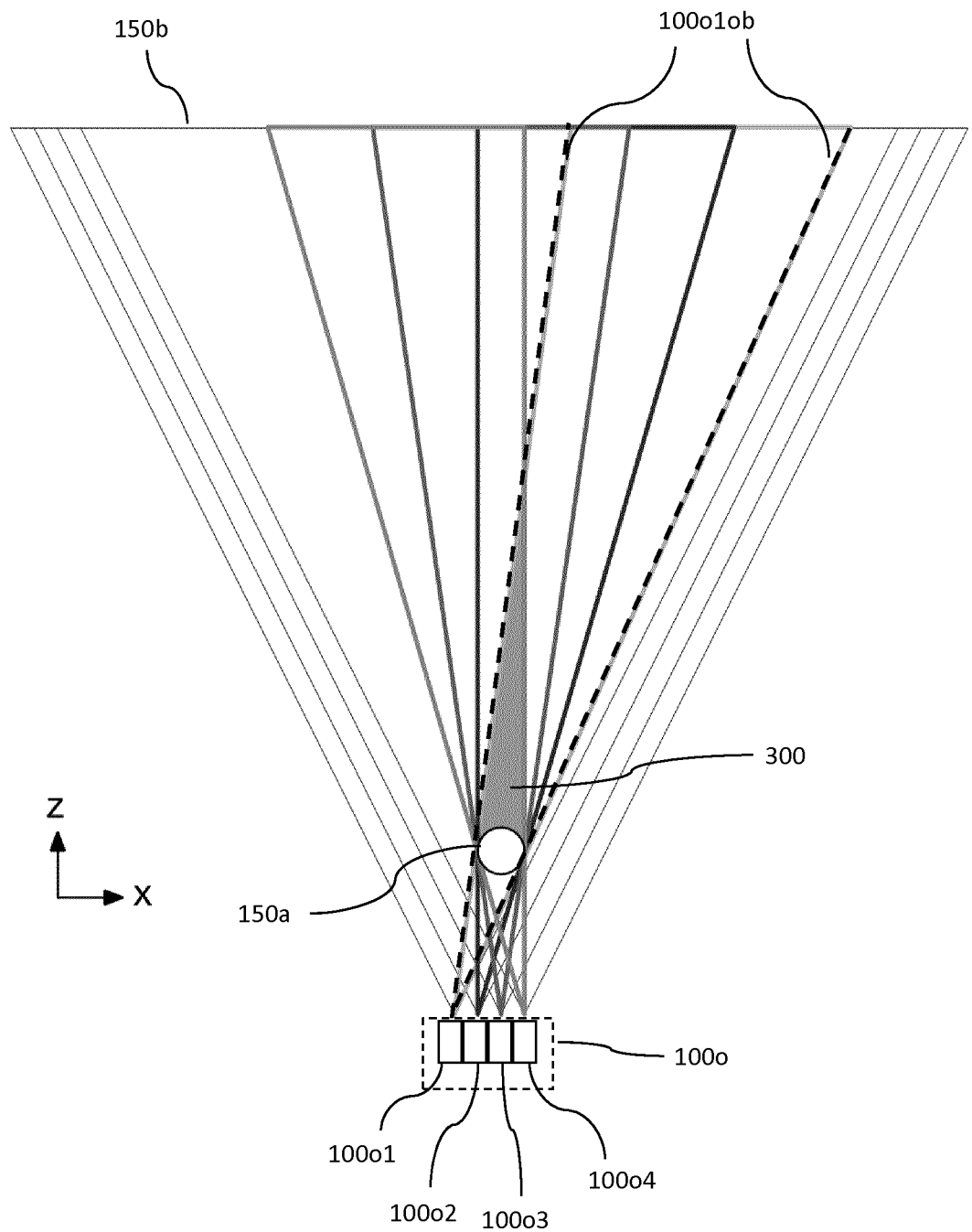

In the present embodiment, the LF capturing system 100 is a camera rig (or camera array) and the optical system 100o comprises 4 camera 100o1 to 100o4 (FIGS. 2a and 3a). In other embodiments not illustrated, the LF capturing system 100 comprises another number of cameras greater than one. In still other embodiments, the LF capturing system 100 is a plenoptic camera and the capturing means are the subsystems composed each of the main lenses, one micro-lens of the micro-lens array, and the corresponding part of the sensor.

Back to FIG. 1, the LF capturing system 100 also comprises a display 100d (e.g. a screen, a touchscreen, etc.) rendering lively an image belonging to the matrix of images delivered by the LF capturing system 100 during the capture of the scene 150. In that case, the image being rendered is named the reference image among the images in the matrix of images. In other embodiments not illustrated, the LF capturing system does not comprise such display and the captured LF data are transmitted to a distant device or directly stored in the LF capturing system for later post-processing. In that case, the reference image is a given image selected among the images of the matrix of images captured by the LF capturing system, and the disclosed method is enforced in post-processing.

Figure 4:
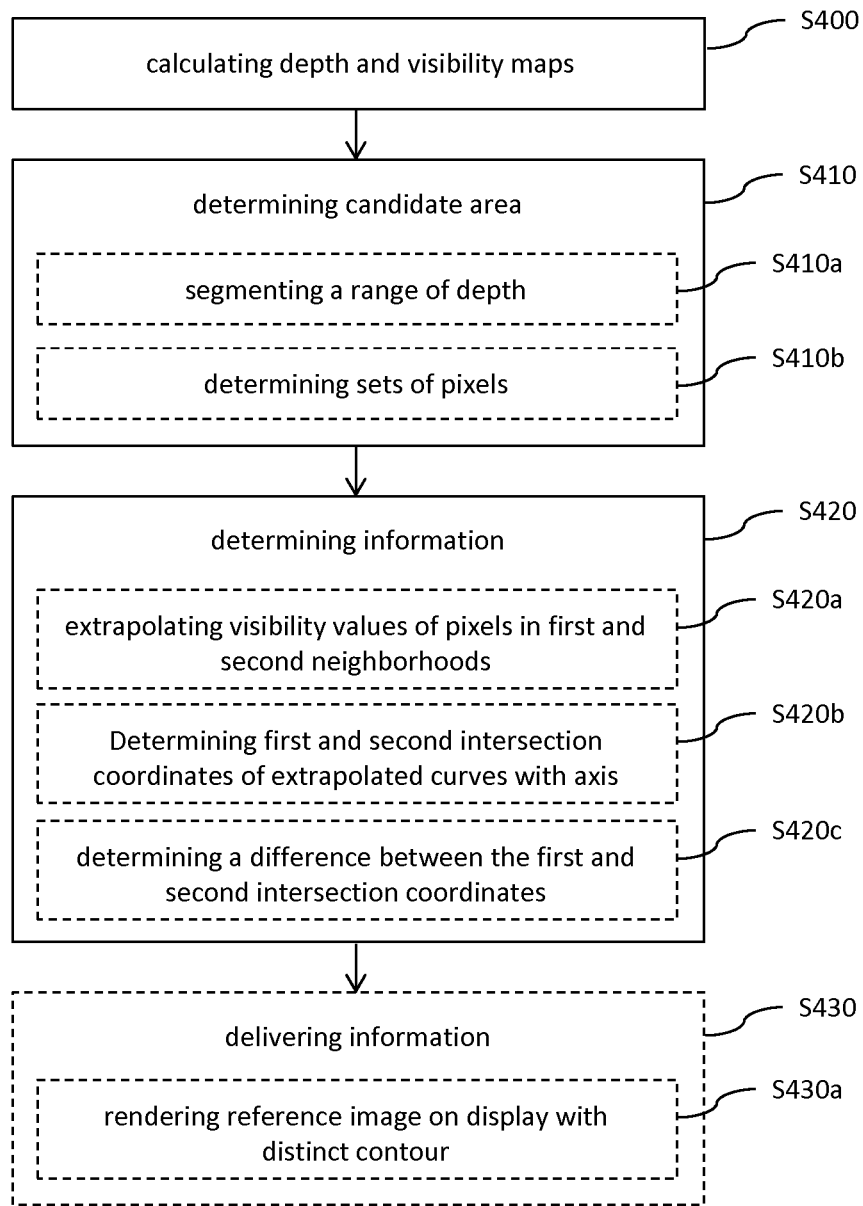
FIG. 4 illustrates a flowchart of a method for informing the user of the LF capturing system of FIG. 1 of a potential occlusion during the capture of the scene according to one embodiment.

Back to FIG. 1, the LF capturing system 100 comprises a device 110 comprising means for enforcing the method of FIG. 4 (method for detecting occlusions in an image captured by the LF capturing system 100). Such device is further discussed below in relation with FIG. 5.

In a first configuration of the scene 150 (FIG. 2a), the foreground object 150a is close to the background object 150b relative to the distance to the optical system 100o of the LF capturing system 100.

Each camera 100o1 to 100o4 capture the scene from a different viewpoint. Consequently, the foreground object 150a hides a different part of the background object 150b for each of the cameras 100o1 to 100o4. For instance, the dashed lines 100o1oa delimit the area not seen by the first camera 100o1 behind the foreground object 150a. The occlusion experienced by the first camera 100o1 corresponds to the intersection of the area in question with the background object 150b. The same holds for the other cameras 100o2 to 100o4, but with a different viewpoint. At the end, the final occlusion is related to the area 200 (area depicted in dark grey in FIG. 2a) corresponding to the intersection of the areas respectively not seen by the camera 100o1 to 100o4 of the system. In other words, there exist no pixel(s) among the images captured by the cameras 100o1 to 100o4 that correspond(s) to the part of the background object 150b belonging to the intersection of the background object 150b in question with the area 200.

In this first configuration, the distance from the foreground object 150a to the optical system 100o remains high in respected of the distance in between the cameras 100o1 to 100o4 of the optical system 100o. Consequently, the area 200 extends up to the background object 150b so that even a final occlusion exists.

In a second configuration of the scene 150 (FIG. 3a), the foreground object 150a is far away from the background object 150b and close to the distance to the optical system 100o of the LF capturing system 100. Furthermore, the width of the foreground object 150a remains lower than the distance in between the cameras 100o1 to 100o4 of the optical system 100o.

Consequently, even if the occlusion experienced by the first camera 100o1 (i.e. the intersection of the area delimited by the dashed lines 100o1ob with the background object 150b) is more important than in the first configuration discussed above, there is no more final occlusion. Indeed, the area 300 (area depicted in dark grey in FIG. 3a), corresponding to the intersection of the areas not seen by each camera 100o1 to 100o4 of the system, no more intercept the background object 150b.

We now describe in relationship with FIG. 4 the steps of a method for detecting occlusions in an image captured by the LF capturing system 100 according to at least one embodiment. The processing associated to those steps are first illustrated through examples discussed in relation with FIGS. 2b to 2i, i.e. when the scene 150 is in the above-mentioned first configuration illustrated in FIG. 2a.

In a step S400, a depth map 210 (FIGS. 2b and 2d) and a visibility map 220 (FIG. 2c) are calculated for pixels in the reference image of the matrix of images delivered by the LF capturing system 100 during the capture of the scene 150.

For instance, the depth map 210 is calculated based on the information contained in the different images of the matrix of images as proposed in the paper from N. Sabater and al, "Dataset and Pipeline for Multi-View Light-Field Video," CVPR'17. In other variants, other suitable known methods are used for calculating the depth map 220 for pixels in the reference image based on the available information.

Conversely, the visibility map 220 indicates the number of cameras among the cameras 100o1 to 100o4 in the LF capturing system 100 that see a given pixel. In the present case, the values of the visibility map 220 are between 1 (pixel seen by a single camera 100o1 or 100o2 or 100o3 or 10004) and 4 (4 being the number of cameras 100o1 to 100o4 in the system). In other embodiments, if a LF capturing system is composed of n cameras, the values of the visibility map are between 1 and n.

Consequently, for calculating the visibility map 220, the pixels of the reference image are parsed successively. For each of those pixels, an equivalent pixel is searched in other images of the matrix of images (i.e. with the same RGB XYZ taking into account geometric and photometric calibration). For each new equivalent pixel found in another image, a counter is incremented for the pixel considered in the reference view. The visibility map 220 is created that indicates the number of images that contain this pixel. In variants, refinements can be used for deriving such visibility map. For instance, the visibility map 220 can be calculated on sub-sampled resolution or by pooling the calculations made when calculating disparity maps between images. In the same way, the disparity maps computed in parallel can be used to optimize the search areas of the equivalents in the other cameras, focusing on the gradient zones of the depth. It is also possible to optimize the equivalents search area by considering the value of the depth gradient and the value of the baseline of the cameras. Alternatively, the algorithm proposed in the paper from K. Wolff, et al., "Point Cloud Noise and Outlier Removal for Image-Based 3D Reconstruction", Proceedings of International Conference on 3D Vision, IEEE, 2016, can be considered for deriving the visibility map.

Figure 2B:
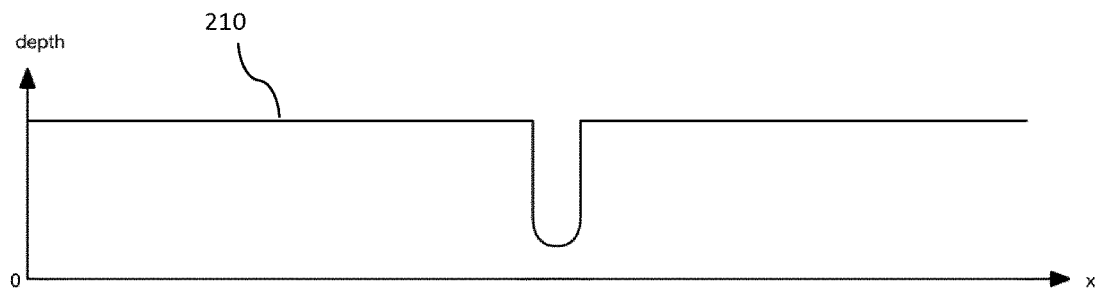
FIGS. 2b and 2c illustrate respectively a depth map and a visibility map obtained for a reference image captured by the LF capturing system of FIG. 1 in the configuration of the scene of FIG. 2a when the LF capturing system enforces the method of FIG. 4.
Figure 2C:
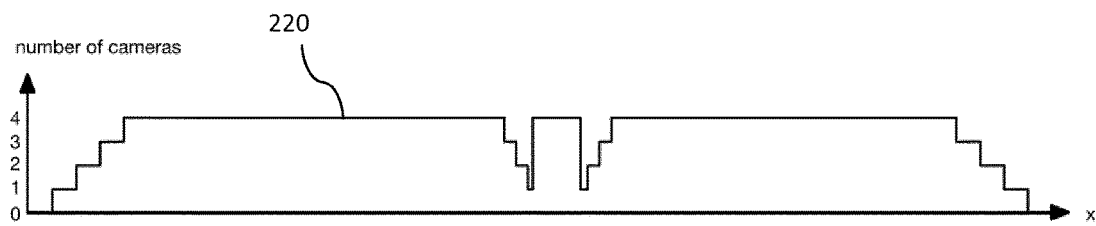
Figure 2D:
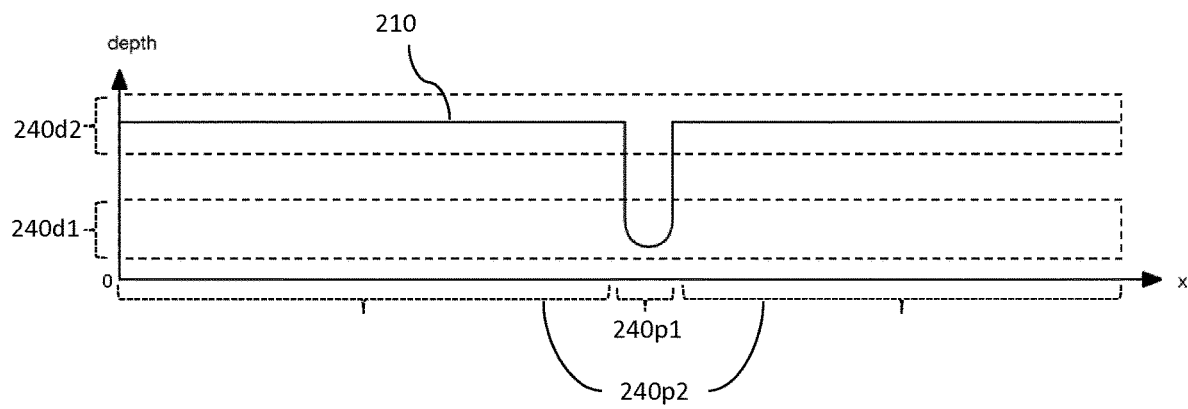

In a step S410, a candidate area 240 (FIGS. 2g, 2h and 2i) in which a potential occlusion may occur in the reference image during the capture of the scene 150 is determined based at least on a segmentation of the depth map 210 (FIGS. 2b and 2d).

For instance, in a step S410a, the range of depth covered by the depth map 210 is segmented into a first depth interval 240d1 (FIG. 2d) and a second depth interval 240d2 (FIG. 2d) of higher average depth than the first depth interval. In a step S410b, a first set of pixels 240p1 (FIG. 2d), resp. a second set of pixels 240p2 (FIG. 2d), corresponding to the first depth interval 240d1, reps. to the second depth interval 240d2 is determined in the reference image. The candidate area 240 corresponds to a subset of pixels of the first set of pixels 240p1 not present in the second set of pixels 240p2.

For instance, the first depth interval 240d1 is selected so as to contain depth values corresponding to the foreground object 150a, and the second depth interval 240d2 is selected so as to contain depth values corresponding to the background object 150b. In that case, the first set of pixels 240p1 is expected to contain pixels representing the foreground object 150a and the second set of pixels 240p2 is expected to contain pixels representing the background object 150b. Thus, pixels in the candidate area 240 as defined above have depth values only in the foreground area of the scene 150 and can be suspected to correspond to parts of the image where an occlusion may occur, i.e. where some parts of the background object 150b could be hidden.

In the example of FIG. 2d where the first 240d1 and second 240d2 depth intervals are not overlapping, the pixels in the first set of pixels 240p1 are necessarily absent from the second set of pixels 240p2. In variants, the different depth intervals used during the enforcement of the steps S410a and S410b can be contiguous or even overlapping.

Figure 2E:
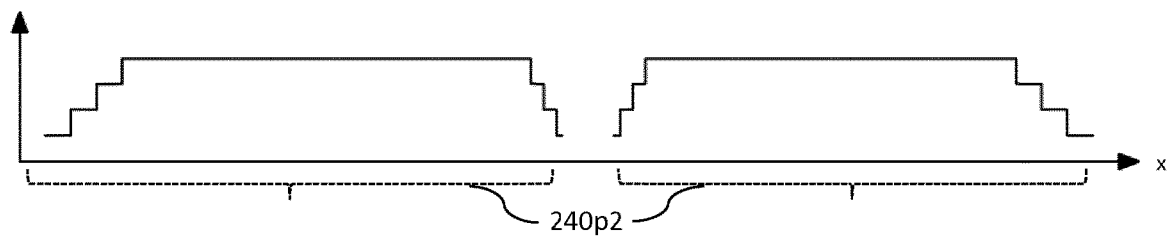
Figure 2F:
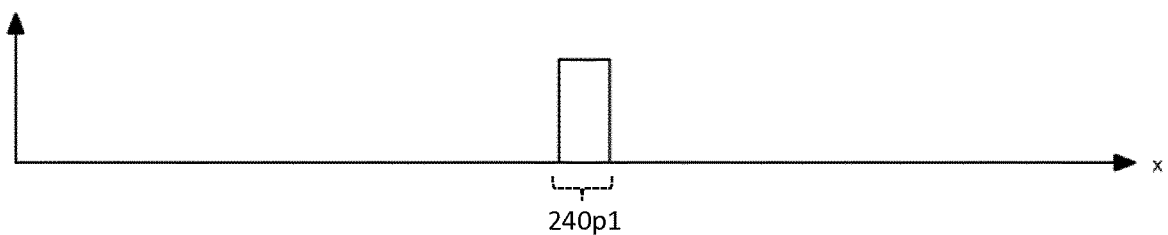

The first 240p1 and second 240p2 sets of pixels define two submaps of the visibility map that corresponds respectively to the visibility values of the pixels in the first set of pixels 240p1 (FIG. 2f) and to the pixels in the second set of pixels 240p2 (FIG. 2e).

In a step S420, an information representative of an occlusion state in the candidate area 240 is determined based at least on visibility values of the visibility map 220 associated with at least two neighborhoods of the candidate area 240.

Figure 2G:
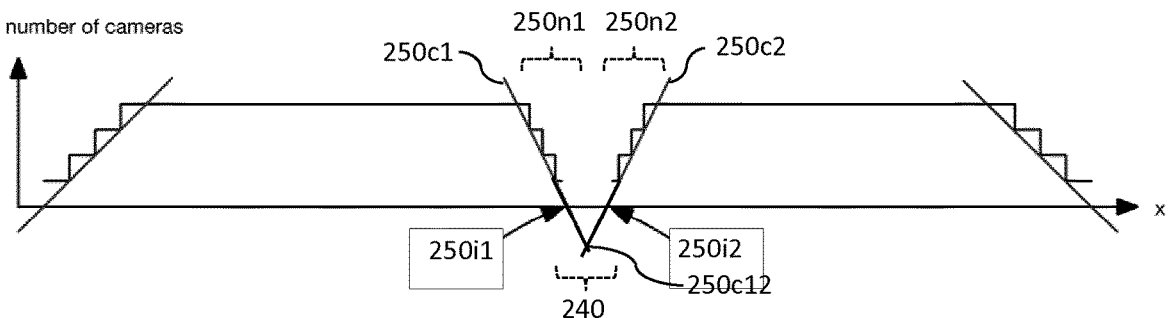
Figure 2H:
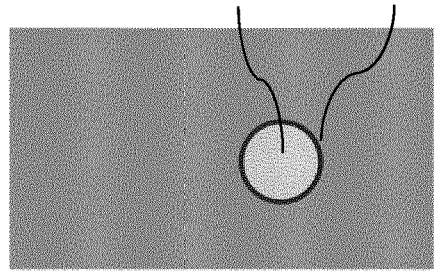
FIGS. 2h and 2i illustrate the rendering of an information representative of an occlusion state according to two embodiments.
Figure 2I:
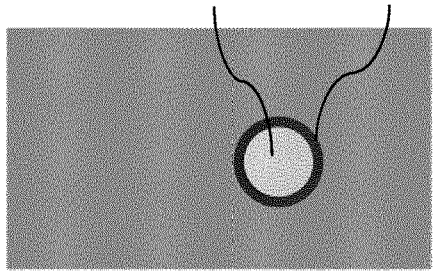

For instance, in a step S420a, the visibility values (provided by the visibility map calculated in step S400) of at least two first pixels belonging to a first neighborhood 250n1 (FIG. 2g), resp. of at least two second pixels belonging to a second neighborhood 250n2 (FIG. 2g), are extrapolated for delivering a first 250c1, resp. second 250c2, extrapolated curve extending toward decreasing visibility values in the visibility map as illustrated in FIG. 2g. Such extrapolation can be based e.g. on a linear (gradient like derivation) or bilinear interpolation, a bicubic interpolation, a Lanczos interpolation, etc.

In the considered first configuration of the scene 150, the intersection 250c12 of the first 250c1 and second 250c2 extrapolated curves occurs for a negative extrapolated visibility (situation of FIG. 2g where the intersection 250c12 is below the x axis). However, visibility is defined as proportional to the number of different images in which a same pixel is present. Thus, a negative extrapolated visibility value may indicate that there are no pixels in the other images of the matrix than the reference one that captured part of the background object 150b located behind the foreground object 150a. In that case, the above-defined information is determined as representative that an occlusion occurs in the candidate area 240.

In other situations where the intersection of the first 250c1 and second 250c2 extrapolated curves occurs for a positive extrapolated visibility (i.e. in a situation where the intersection would be above the x axis), it can be expected that there is at least one pixel of another image of the matrix that captured part of the background object 150b located behind the foreground object 150a. In such situations, the information is determined as representative that no occlusion occurs in the candidate area 240. In alternative embodiments, no information is explicitly determined in such situations in order to simplify the derivations.

Back to FIG. 4, the step S420 is enforced successively for each line and column of the reference image. Thus, the full information retrieved from the visibility of pixels all around the candidate area 240 can be used for determining the information.

More particularly, when the step S420 is enforced for a line or a column of the reference image, the first 250c1 and second 250c2 extrapolated curves extend in a cut plane of the visibility map 220 following the line or column in question (FIGS. 2b to 2g illustrate a cut of the depth map 210 and the visibility map 220 along such line or column). In other embodiments, any other cut line than a line or a column of the reference image is used for enforcing the step 420.

Back to FIG. 4, the determination of the information comprises the following steps in case the first 250c1 and second 250c2 extrapolated curve intercept each other for a negative extrapolated visibility value (i.e. when an occlusion is detected following step S420a):

in a step S420b, an intersection of the first 250c1 and second 250c2 extrapolated curves with an axis of null visibility in the cut plane of the visibility map 220 is determined for delivering first 250i1 and second 250i2 intersection coordinates (FIG. 2g); and in a step S420c, a difference between the first 250i1 and second 250i2 intersection coordinates is determined.

The magnitude of the difference between the first 250i1 and second 250i2 intersection coordinates is representative of the magnitude of the occlusion. The information takes into account also for the magnitude of such difference.

More particularly, such magnitude makes the link between on one hand the rate of decrease of the visibility in the neighborhood 250n1, 250n2 of the candidate area 240 and on the other hand the width of the candidate area 240 itself. Having a slow decrease in the visibility can indeed compensate for a candidate area 240 with a high width. In other words, even facing a candidate area 240 with a high width, a slow decrease in the visibility of pixels in the neighborhood 250n1, 250n2 of the area 240 in question may result in a low magnitude of the difference between the first 250i1 and second 250i2 intersection coordinates. In that case, it may indicate that despite the high width of the candidate area 240, the occlusion may remain weak. Such situation occurs for instance when there is a high enough distance between the foreground 150a and background 150b objects. The magnitude of the difference is therefore expected to be representative of the area in which no visibility is expected and thus to be representative of the occlusion in the end.

When the above-discussed processing involved in step S420 is enforced successively for each line and column of the reference image, a new information representative of the occlusion state in the candidate area 240, named an intermediate information, is delivered each time. The successive enforcement for each line and column of the step S420 delivers a set of intermediate information. In that case, the information is representative that an occlusion occurs in the candidate area 240 when a percentage of intermediate information that are representative that an occlusion occurs, relative to the total number of intermediate information in the set of intermediate information, is greater than a given threshold (e.g. 50%).

Having that the processing involved in step S420 is enforced successively for each line and column of the reference image, the magnitude of the difference between the first 250i1 and second 250i2 intersection coordinates is integrated for each enforcement of the step S420 for delivering an integrated difference. In that case, the information takes into account also for the integrated difference.

In other embodiments not illustrated, the step S420 is not enforced successively for each line and column of the reference image, but rather for a single cut-line of the reference image, or at least a limited number of cut-lines, for decreasing the computational load of the device 110.

In the embodiment illustrated in FIG. 4, the disclosed method is enforced during the capture of the scene 150 by the LF capturing system 100 so that in a step S430 the information is delivered to the user 120 of the LF capturing system 100.

For that, in a step S430a the reference image is rendered lively on the display 100d of the LF capturing system 100 with a distinct contour 260t (FIG. 2h) plotted around the candidate area 240. In variants, the thickness of the distinct contour 260t, 260b (FIG. 2i) may be representative of the estimated magnitude of the occlusion, for instance when the information takes into account also for the magnitude of the integrated difference (e.g. the bolder the distinct contour, the higher the estimated magnitude of the occlusion).

In other embodiments not illustrated, the information is delivered to the user through other communication means (e.g. through an audible signal, etc.).

In variants, more than one candidate area determined in step S410. In that case, the step S420 is enforced for different candidate areas among the ones determined in step S410. The information delivered to the user during the enforcement of step S430 is representative of an occlusion state in the corresponding candidate areas. For instance, a distinct contour is plotted around each of the candidate areas for which the information is representative that an occlusion occurs.

In still other embodiments, the disclosed method is enforced in post-processing and the information determined in step S420 is delivered in step S430 whether to a person performing the post-processing (e.g. through a dedicated warning), whether as an input for another method relying on such detection, or whether as a metadata associated to the LF data.

Figure 3B:
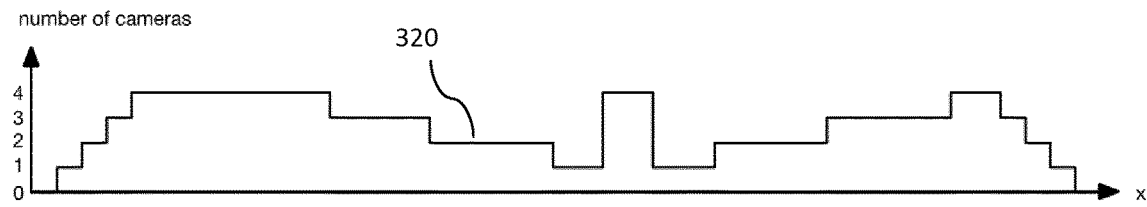
FIG. 3b illustrates a visibility map obtained for the reference image captured by the LF capturing system of FIG. 1 in the configuration of the scene of FIG. 3a when the LF capturing system in question enforces the method of FIG. 4.
Figure 3C:
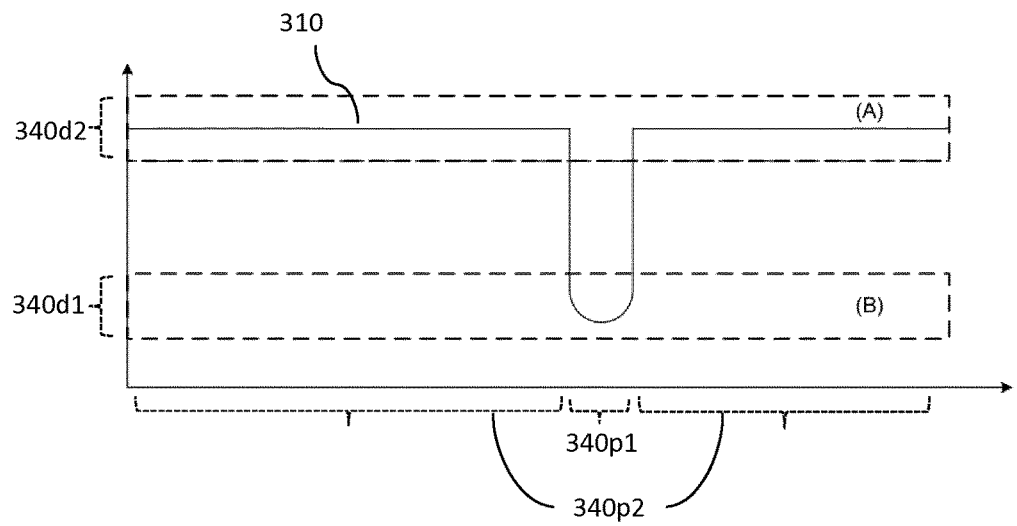
Figure 3D:
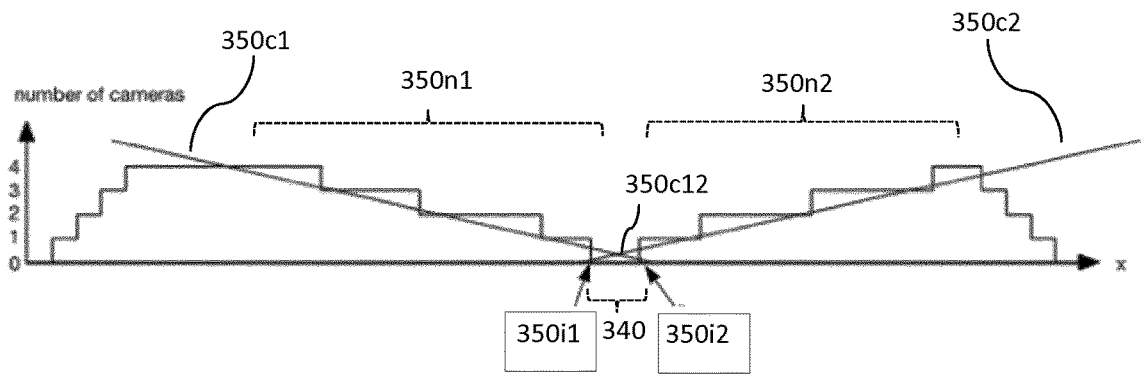

We discuss further the processing involved in the method of FIG. 4 now in relationship with FIGS. 3b to 3d i.e. when the scene 150 is in the above-mentioned second configuration illustrated in FIG. 3a.

More particularly, in this second configuration of the scene 150, the foreground object 150a is far away from the background object 150b and close to the optical system 100o of the LF capturing system 100. Furthermore, the width of the foreground object 150a remains lower than the distance in between the cameras 100o1 to 100o4 of the optical system 100o. Consequently, there is no more final occlusion existing as discussed above.

Thus, a visibility map 320 (FIG. 3b), calculated for the reference image during the step S400, shows smoother variations for pixels around the central parts i.e. around the part corresponding to the foreground object 150a) than in the visibility map 220 calculated in the first configuration (FIG. 2c).

A depth map 310 (FIG. 3c) is also calculated during the step S400. The range of depth covered by the depth map 310 is broader than in the depth map 210 due to the fact that the foreground object 150a is farer away from the background object 150b in the second configuration of the scene 150 than in the first configuration.

The enforcement of step S410, and more particularly of steps S410a and S410b delivers a first set of pixels 340p1 and a second set of pixels 340p2 (FIG. 3c), corresponding respectively to a first depth interval 340d1 and to a second depth interval 340d2 of higher average depth than the first depth interval. In the present example, the first depth interval 340d1 is selected so as to contain depth values corresponding to the foreground object 150a, and the second depth interval 340d2 is selected so as to contain depth values corresponding to the background object 150b. A candidate area 340 is determined as a subset of pixels of the first set of pixels 340p1 not present in the second set of pixels 340p2. However, in the present example, the first 340d1 and second 340d2 depth intervals are not overlapping. Thus, the pixels in the first set of pixels 340p1 are necessarily absent from the second set of pixels 340p2.

During the enforcement of step S420, and more particularly of steps S420a, the visibility values of at least two first pixels belonging to a first neighborhood 350n1 of the candidate area 340, resp. at least two second pixels belonging to a second neighborhood 350n2 of the candidate area 340, are extrapolated (based e.g. on a linear (gradient like derivation) or bilinear interpolation, a bicubic interpolation, a Lanczos interpolation, etc.) for delivering a first 350c1, resp. second 250c2, extrapolated curve as illustrated in FIG. 3d.

However, on the opposite of what occurred in the first configuration of the scene 150, in the present second configuration the intersection 350c12 of the first 350c1 and second 250c2 extrapolated curves occurs for a positive extrapolated visibility. Consequently, the information is representative that no occlusion occurs in the candidate area 340. For instance, when the disclosed method is enforced during the capture of the scene 150 by the LF capturing system 100, no distinct contour is displayed around the candidate area 340 on the display 100d of the LF capturing system 100 in that case.

Figure 5:
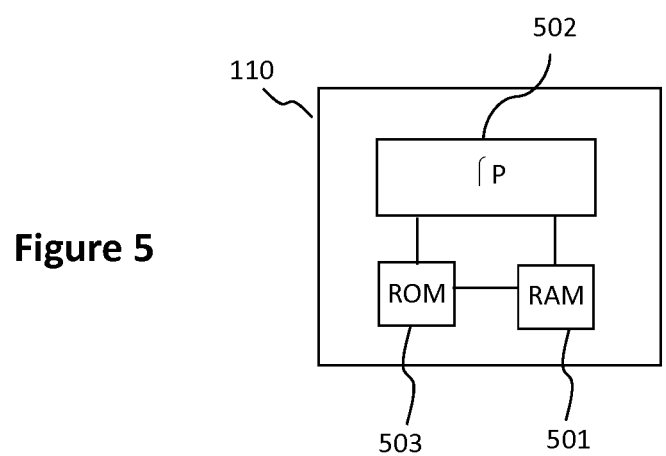
FIG. 5 illustrates an exemplary device that can be used for implementing the method of FIG. 4.

FIG. 5 illustrates the structural blocks of a particular embodiment of the device 110 (see FIG. 1) that can be used for implementing the method for informing a user of a light field capturing system of a potential occlusion during a capture of a scene according to the disclosure (according to any of the embodiments disclosed above).

In this embodiment, the device 110 for implementing the disclosed method comprises a non-volatile memory 503 (e.g. a read-only memory (ROM) or a hard disk), a volatile memory 501 (e.g. a random-access memory or RAM) and a processor 502. The non-volatile memory 503 is a non-transitory computer-readable carrier medium. It stores executable program code instructions, which are executed by the processor 502 in order to enable implementation of the method described above (method for informing a user of a LF capturing system of a potential occlusion during a capture of a scene according to the disclosure) in its various embodiment disclosed above in relationship with FIG. 4.

Upon initialization, the aforementioned program code instructions are transferred from the non-volatile memory 503 to the volatile memory 501 so as to be executed by the processor 502. The volatile memory 501 likewise includes registers for storing the variables and parameters required for this execution.

All the steps of the above method for informing a user of a light field capturing system of a potential occlusion during a capture of a scene according to the disclosure may be implemented equally well:

- by the execution of a set of program code instructions executed by a reprogrammable computing machine such as a PC type apparatus, a DSP (digital signal processor) or a microcontroller. This program code instructions can be stored in a non-transitory computer-readable carrier medium that is detachable (for example a floppy disk, a CD-ROM or a DVD-ROM) or non-detachable; or
- by a dedicated machine or component, such as an FPGA (Field Programmable Gate Array), an ASIC (Application-Specific Integrated Circuit) or any dedicated hardware component.

In other words, the disclosure is not limited to a purely software-based implementation, in the form of computer program instructions, but that it may also be implemented in hardware form or any form combining a hardware portion and a software portion.

According to one embodiment, a method is proposed for detecting occlusions in an image captured by a light field capturing system, comprising, for at least one reference image belonging to a matrix of images captured by the light field capturing system:

calculating a depth map and a visibility map for pixels in the reference image;

determining at least one candidate area in the reference image in which the potential occlusion may occur based at least on a segmentation of the depth map;

determining an information representative of an occlusion state in said at least one candidate area based at least on visibility values of the visibility map associated with at least two neighborhoods of said at least one candidate area.

Thus, the present disclosure proposes a new and inventive solution for detecting occlusions in an image captured by a LF capturing system (e.g. a camera rig or array, a plenoptic camera, etc.) that takes advantage of the information available in the different views of the LF data.

Furthermore, the determination of the information representative of the occlusion state relies only on parameters easily derivable (e.g. depth and visibility) with few additional derivations so that the method can easily be enforced. For instance, the method can be used in a real time environment so as to inform the user of the LF capturing system during a capture of the image in question. In that case, the user is able to change the position and/or orientation of the LF capturing system so as to avoid the presence of the occlusion if any.

According to one embodiment, a device is proposed for detecting occlusions in an image captured by a light field capturing system, comprising a processor or a dedicated machine configured for, for at least one reference image belonging to a matrix of images captured by the light field capturing system:

calculating a depth map and a visibility map for pixels in the reference image;

determining at least one candidate area in the reference image in which the potential occlusion may occur based at least on a segmentation of the depth map;

determining an information representative of an occlusion state in said at least one candidate area based at least on visibility values of the visibility map associated with at least two neighborhoods of said at least one candidate area.

According to one embodiment, the determining at least one candidate area comprises:

segmenting a range of depth covered by the depth map delivering at least a first depth interval and a second depth interval of higher average depth than the first depth interval;

determining a first set of pixels, resp. a second set of pixels, in the reference image corresponding to the first depth interval, reps. to the second depth interval. The at least one candidate area corresponds to a subset of pixels of the first set of pixels not present in the second set of pixels.

Thus, the first set of pixels corresponds for instance to parts of the reference image that are in the foreground and the second set of pixels corresponds to parts of the reference image that are in the background (In the particular case where the first and second depth intervals are not overlapping, the pixels in the first set of pixels are necessarily absent from the second set of pixels). Pixels that have depth values only in the foreground can be suspected to correspond to parts of the image where an occlusion may occur, i.e. where some objects in the background could be hidden.

According to one embodiment, the determining an information comprises extrapolating visibility values of at least two first pixels, resp. at least two second pixels, belonging to a first neighborhood, resp. to a second neighborhood, of said at least one candidate area delivering a first, resp. second, extrapolated curve extending toward decreasing visibility values in the visibility map. The information is representative that an occlusion occurs in said at least one candidate area when the first and second extrapolated curves intercept each other for a negative extrapolated visibility value.

Such extrapolation can be based e.g. on a linear (gradient like derivation) or bilinear interpolation, a bicubic interpolation, a Lanczos interpolation, etc.

More particularly, when the intersection of the first and second extrapolated curves occurs for a negative extrapolated visibility, it can be expected that there is no pixels in the other images of the matrix than the reference one that captured part of the background located behind the foreground defined through the first depth interval (as visibility is defined as proportional to the number of different images in which a same pixel is present).

Conversely, when the intersection of the first and second extrapolated curves occurs for a positive extrapolated visibility, it can be expected that there is at least one pixel of another image of the matrix that captured part of the background located behind the foreground.

According to one embodiment, the determining an information is enforced at least for a line or a column, of the reference image, the first and second extrapolated curves extending in a cut plane of the visibility map following the line or column. The determining the information comprises when the first and second extrapolated curve intercept each other for a negative extrapolated visibility value:

determining an intersection of the first and second extrapolated curves with an axis of null visibility in the cut plane delivering first and second intersection coordinates; and determining a difference between the first and second intersection coordinates. A magnitude of the difference is representative of a magnitude of the occlusion. The information takes into account also for the magnitude of the difference.

Thus, the magnitude of the difference is expected to be representative of the area in which no visibility is expected and thus to be representative of the magnitude of the occlusion.

According to one embodiment, the determining an information is enforced successively for each line and column of the reference image delivering each time a new information representative of the occlusion state in said at least one candidate area, named an intermediate information. The successive enforcement for each line and column delivers a set of intermediate information.

Thus, the full information retrieved from the visibility of pixels all around the candidate area can be used for determining the information.

According to one embodiment, the information is representative that an occlusion occurs in said at least one candidate area when a percentage of intermediate information that are representative that an occlusion occurs, relative to the total number of intermediate information in the set of intermediate information, is greater than a given threshold.

According to one embodiment, the magnitude of the difference is integrated for each enforcement of the act of determining an information delivering an integrated difference. The information takes into account also for the integrated difference.

According to one embodiment, the method further comprises, or the device is further configured for, delivering the information to a user of the light field capturing system during a capture of the reference image.

According to one embodiment, the act of delivering the information comprises rendering the reference image on a display of the light field capturing system with a distinct contour plotted around said at least one candidate area.

According to one embodiment, a thickness of the distinct contour is a function of the integrated difference.

According to one embodiment, a non-transitory computer readable medium comprising a computer program product recorded thereon and capable of being run by a processor, including program code instructions comprising program code instructions for implementing a method for detecting occlusions in an image captured by a light field capturing system previously described is proposed.

The invention claimed is:

1. A method for detecting occlusions in an image comprising:
   determining a depth map and a visibility map for at least one reference image received in a matrix of images;
   determining a candidate area in said reference image where occlusions are likely to occur by segmenting said depth map; and
   determining visibility information associated with an occlusion state associated with different parts of said candidate area, wherein said visibility information includes at least one visibility value associated with two neighborhoods in said candidate area as defined by said visibility map.

2. The method of claim 1, wherein determining said candidate area comprises:
   segmenting a range of depth covered by said depth map delivering at least a first depth interval and a second depth interval of higher average depth than the first depth interval; and
   determining a first set of pixels associated with said reference image, and a second set of pixels in said reference image corresponding to said first depth interval and said second depth interval, respectively, wherein said pixels in the first set of pixels are not represented in the second set of pixels.

3. The method of claim 1, wherein determining visibility information comprises extrapolating visibility values provided by said determined visibility map of at least two first pixels belonging to a first neighborhood of said two neighborhoods and at least two second pixels to a second neighborhood, such that they form an extrapolated curve extending toward decreasing visibility values in said visibility man.

4. The method of claim 3, wherein said extrapolating is enforced at least for a line or a column of said reference image such that first and second extrapolated curves extend in a cut plane in said visibility map following said line or said column.

5. The method of claim 4, wherein said visibility information is further determined by said first and second extrapolated curves intercepting each other for a negative extrapolated visibility value.

6. The method of claim 5, further comprising:
determining an intersection of said first and second extrapolated curves with an axis of null visibility in said cut plane delivering first and second intersection coordinates; and
determining a difference between said first and second intersection coordinates, a magnitude of said difference being representative of a magnitude of said occlusion state.

7. The method of claim 4, wherein said extrapolating is enforced successively for each line and column of said reference image, delivering each time an intermediate information representative of said occlusion state in said candidate area, said successive enforcement for each line and column delivering a set of intermediate information.

8. The method of claim 7, wherein said occlusion state is determined to be occurring when at least a percentage of intermediate information in said candidate area is affected based on a given threshold.

9. The method of claim 1, further comprising delivering said visibility information to a user of a light field capturing system during a capture of said reference image.

10. The method of claim 9, wherein delivering said visibility information comprises rendering said reference image on a display of said light field capturing system with a distinct contour plotted around said candidate area.

11. The method of claim 10, wherein a thickness of said distinct contour is a function of an integration of said differences determined successively for each line and column.

12. A non-transitory computer-readable medium storing a computer program product having program code instructions for implementing the method according to claim 1, when said program is executed on a computer or a processor.

13. A device for detecting occlusions in an image:
a light field system having at least a camera for capturing a matrix of images; and
a processor configured for:
determining a depth map and a visibility map for at least one reference image received in a matrix of images;
determining a candidate area in said reference image where occlusions are likely to occur by segmenting said depth map; and
determining visibility information associated with an occlusion state associated with different parts of said candidate area, wherein said visibility information includes at least one visibility value associated with two neighborhoods in said candidate area as defined by said visibility map.

14. The device of claim 13, wherein determining said candidate area comprises:
segmenting a range of depth covered by said depth map delivering at least a first depth interval and a second depth interval of higher average depth than the first depth interval; and
determining a first set of pixels associated with said reference image, and a second set of pixels in said reference image corresponding to said first depth interval and responsive to said second depth interval, respectively, wherein said pixels in the first set of pixels are not represented in the second set of pixels.

15. The device of claim 13, wherein determining visibility information comprises extrapolating visibility values provided by said determined visibility map of at least two first pixels belonging to a first neighborhood of said two neighborhoods and at least two second pixels to a second neighborhood, such that they form an extrapolated curve extending toward decreasing visibility values in said visibility man.

16. The device of claim 15, wherein said extrapolating is enforced at least for a line or a column of said reference image such that first and second extrapolated curves extend in a cut plane in said visibility map following said line or said column.

17. The device of claim 16, wherein said visibility information is further determined by said first and second extrapolated curves intercepting each other for a negative extrapolated visibility value.

18. The device of claim 17 wherein said processor is further configured to:
determine an intersection of said first and second extrapolated curves with an axis of null visibility in said cut plane delivering first and second intersection coordinates; and
determine a difference between said first and second intersection coordinates, a magnitude of said difference being representative of a magnitude of said occlusion state.

19. The device of claim 16, wherein said extrapolating is enforced successively for each line and column of said reference image, delivering each time an intermediate information representative of said occlusion state in said candidate area, said successive enforcement for each line and column delivering a set of intermediate information.

20. The device of claim 19, wherein said occlusion state is determined to be occurring when at least a percentage of intermediate information in said candidate area is affected based on a given threshold.

21. The device of claim 13, further comprising delivering said visibility information to a user of a light field capturing system during a capture of said reference image.

22. The device of claim 21, wherein delivering said visibility information comprises rendering said reference image on a display of said light field capturing system with a distinct contour plotted around said candidate area.

23. The device of claim 22, wherein a thickness of said distinct contour is a function of an integration of said differences determined successively for each line and column.

* * * * *